(12) United States Patent
Storm (10) Patent No.: US 7,570,371 B1
(45) Date of Patent: Aug. 4, 2009

(54) APPARATUS AND METHOD FOR MEASURING VOLUMES

(76) Inventor: Thomas W. Storm, 1602 Augusta Way, Casselberry, FL (US) 32707

( * ) Notice: Subject to any disclaimer, the term of this patent is extended or adjusted under 35 U.S.C. 154(b) by 0 days.

(21) Appl. No.: 12/151,982

(22) Filed: May 12, 2008

(51) Int. Cl.
 *G01B 11/22* (2006.01)
(52) U.S. Cl. .................................. 356/627; 250/559.21
(58) Field of Classification Search .............. 356/627; 250/559.21
 See application file for complete search history.

(56) References Cited

U.S. PATENT DOCUMENTS

| | | | |
|---|---|---|---|
| 3,681,747 | A | 8/1972 | Walsh |
| 4,417,817 | A | 11/1983 | Bohme et al. |
| 4,773,029 | A | 9/1988 | Claesson et al. |
| 5,043,735 | A | 8/1991 | Mawhinney et al. |
| 5,161,313 | A | 11/1992 | Rijlaarsadam |
| 5,202,740 | A | 4/1993 | Kivits |
| 5,274,271 | A | 12/1993 | McEwan |
| 5,422,861 | A | 6/1995 | Stringer et al. |
| 5,477,622 | A | 12/1995 | Skalnik |
| 5,528,517 | A | 6/1996 | Loken |
| 5,572,427 | A | 11/1996 | Link et al. |
| 5,661,561 | A | 8/1997 | Wurz et al. |
| 5,663,498 | A * | 9/1997 | Storm ........................ 73/149 |
| 5,900,833 | A * | 5/1999 | Sunlin et al. ................ 342/22 |
| 6,369,401 | B1 * | 4/2002 | Lee ........................ 250/559.21 |
| 6,373,579 | B1 * | 4/2002 | Ober et al. .................. 356/627 |
| 6,683,694 | B2 * | 1/2004 | Cornil ........................ 356/627 |
| 6,914,552 | B1 | 7/2005 | McEwan |
| 6,986,294 | B2 * | 1/2006 | Fromme et al. ............. 73/865.8 |
| 7,113,125 | B2 * | 9/2006 | Le Sesne .................... 342/124 |
| 7,472,031 | B2 * | 12/2008 | Georgitsis ................... 702/101 |
| 2003/0086096 | A1 * | 5/2003 | Cornil ........................ 356/627 |
| 2004/0031335 | A1 * | 2/2004 | Fromme et al. ............... 73/865 |
| 2006/0132351 | A1 * | 6/2006 | Le Sesne .................... 342/124 |
| 2008/0047760 | A1 * | 2/2008 | Georgitsis ...................... 177/1 |
| 2008/0092488 | A1 * | 4/2008 | Gabrielsen et al. ........... 53/428 |

FOREIGN PATENT DOCUMENTS

| | | |
|---|---|---|
| JP | 0174722 | 10/1984 |
| JP | 0302106 | 12/1989 |

OTHER PUBLICATIONS

Web page "Welcome to the Website for Candidate LLNL Technologies for Business Plan Competitions Oct. 2007" (Industrial Partnerships Office at the Lawrence Livermore National Laboratory (LLNL). Publish Date: Oct. 2007.
Low-Cost, Passive, Long-Range Ultrawide Band (UWB) RFID Tags descriptive page (Lawrence Livermore National Laboratory) Publish Date: Oct. 2007.

* cited by examiner

*Primary Examiner*—Roy Punnoose
(74) *Attorney, Agent, or Firm*—Paul S. Rooy (57) ABSTRACT

An apparatus and method for measuring volumes. The apparatus includes a base having a central processing unit, a receiver and 3-D radar; and a scanner having a transmitter, a penetrating sensor, and a trigger in communication with a microprocessor, and a plurality of radio frequency identification tags. An alternate embodiment scanner may include an exclusion control, which instructs the central processing unit to exclude floor, ceiling, and/or walls from the volume calculation. The method of measuring volumes includes the steps of the central processing unit determining a position of the scanner relative to the base, scanning an object with the penetrating sensor, transmitting the points scanned to the central processing unit, and calculating the volume of the object(s) scanned by summing a base vector with a scanner vector to determine a target position vector for each point scanned.

14 Claims, 6 Drawing Sheets

APPARATUS AND METHOD FOR MEASURING VOLUMES

CLAIM FOR PRIORITY

This utility patent application is based upon and claims the benefit of the earlier filing date of U.S. provisional patent application Ser. No. 60/848,876 filed Oct. 3, 2006 entitled Apparatus and Method for Measuring Volumes, and U.S. utility patent application Ser. No. 11/901,734 filed Sep. 19, 2007 entitled Apparatus and Method for Measuring Volumes.

BACKGROUND OF THE INVENTION

1. Field of the Invention

This invention relates to measurement systems, and in particular to an Apparatus and Method for Measuring Volumes.

2. Background of the Invention

The problem of volume measurement of disparately shaped goods has long defied simple solution. Since the dawn of human history, volume measurement of differently shaped objects has been important for a number of reasons: to be able to estimate the space required to store the items, to transport the items, to package the items, etc. For example, early sailing vessels incorporated only limited storage space for provisions, so effective trip logistics planning demanded accurate volume estimates of provisions—the survival of the crew and passengers could depend on it!

In more recent history, precise cubic volume measurement is crucial in ocean and air freight containerization, railroad box car and railroad container loading, efficient storage, and over-the-road shipment of lots comprising odd-shaped items such as household goods.

In addition, from the expense perspective, since the cost charged to store or to transport items is frequently linked to the cubic volume of the goods, it can be very costly to the shipper or the storage facility owner to underestimate the volume of goods. Similarly, a shipper or bailor's ability to accurately estimate cubic volume of goods to be shipped or stored facilitates more accurate cost quotes and contributes to the orderliness of these markets, to the benefit of the economy as a whole.

Existing Designs and Methods

Currently, hand tools such as measuring tapes and yardsticks are used to measure the volume of disparately-shaped goods. To take one example, in the area of household goods volume measurement, the cubic volume of a refrigerator or stove may be fairly readily estimated using a measuring tape. Volume measurement of more complex shapes such as sofas, desk chairs, loveseats, dining room chairs, tables, etc., however, is not so easily accomplished.

Given these irregular shapes, visual estimation becomes necessary, with attendant inaccuracy. In fact, in the average household goods move, the cubic volume estimate at the quotation stage may contain errors as high as 10-20% or more. These erroneous estimates can contribute to the under-utilization of shipping resources, which leads to wasted shipping space, increased costs, and wasted fuel. These disadvantages operate to the detriment of not only the shipping and storage industry, but to the detriment of society at large.

SUMMARY OF THE INVENTION

Accordingly, it is an object of the present invention to provide a volume measurement apparatus and method which will accurately measure the cubic volume of complex-shaped three dimensional objects. Design features allowing this object to be accomplished include a scanner in communication with a base having a central processing unit capable of calculating the volume of an object scanned by the scanner. Advantages associated with the accomplishment of this object include increased transportation and storage efficiency, along with the associated cost and transportation fuel savings.

It is another object of the present invention to provide a volume measurement apparatus and method which is small and easily transportable. Design features allowing this object to be accomplished include a hand-held scanner and compact base. Benefits associated with the accomplishment of this object include reduced collapsed size, along with the associated easier storage and transportation.

It is another object of this invention to provide a volume measurement apparatus and method which may be instructed to ignore walls, ceiling and floor in a its scanning. Design features enabling the accomplishment of this object include a scanner having an exclusion control, actuation of which instructs the scanner not to include surfaces scanned while the exclusion control is actuated (such as floors, walls and ceilings) in the scanned volume calculation. Advantages associated with the realization of this object include increased accuracy and ease of use.

It is another object of this invention to provide a volume measurement apparatus and method which may be instructed to subtract object voids in its scanning and calculation of object volume. Design features enabling the accomplishment of this object include a scanner having a void control, actuation of which instructs the scanner not to include voids scanned while the void control is actuated in the scanned volume calculation. Advantages associated with the realization of this object include increased accuracy and ease of use.

It is still another object of this invention to provide a volume measurement apparatus and method which is easy to use. Design features allowing this object to be achieved include a hand-held scanner having simple controls in communication with a base. Benefits associated with reaching this objective include reduced operator training cost, and ease of use.

BRIEF DESCRIPTION OF THE DRAWINGS

The invention, together with the other objects, features, aspects and advantages thereof will be more clearly understood from the following in conjunction with the accompanying drawings.

Six sheets of drawings are provided. Sheet one contains FIGS. 1 and 2. Sheet two contains FIGS. 3 and 4. Sheet three contains FIGS. 5 and 6. Sheet four contains FIG. 7. Sheet five contains FIGS. 8 and 9. Sheet six contains FIG. 10.

DETAILED DESCRIPTION OF THE PREFERRED EMBODIMENT

Figure 1:
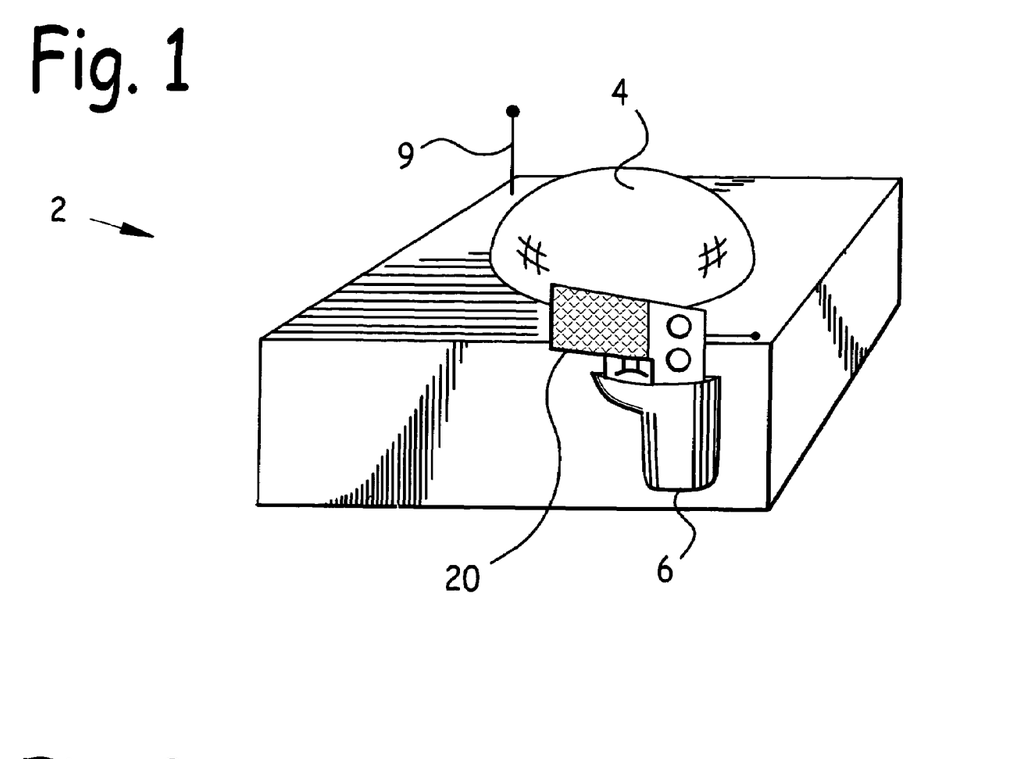
FIG. 1 is a front isometric view of a base station.
Figure 4:
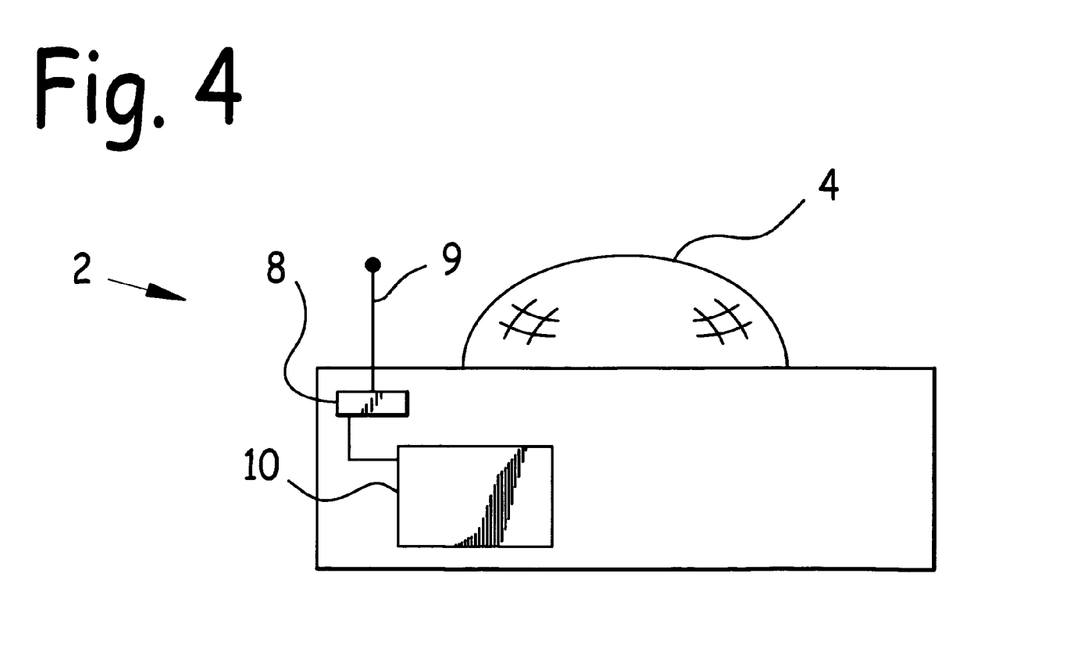
FIG. 4 is a front cross-sectional view of a base station.

FIG. 1 is a front isometric view of base station 2. FIG. 4 is a front cross-sectional view of base station 2. As may be observed in these two figures, base station 2 comprises CPU 10 (a central processing unit) electronically connected with 3-D radar 4 and receiver 8. Receiver 8 is connected with receiver antenna 9, which enhances reception of signals from scanner 20. Base station 2 also comprises dock 6, sized to admit scanner 20 for storage and transportation.

Figure 2:
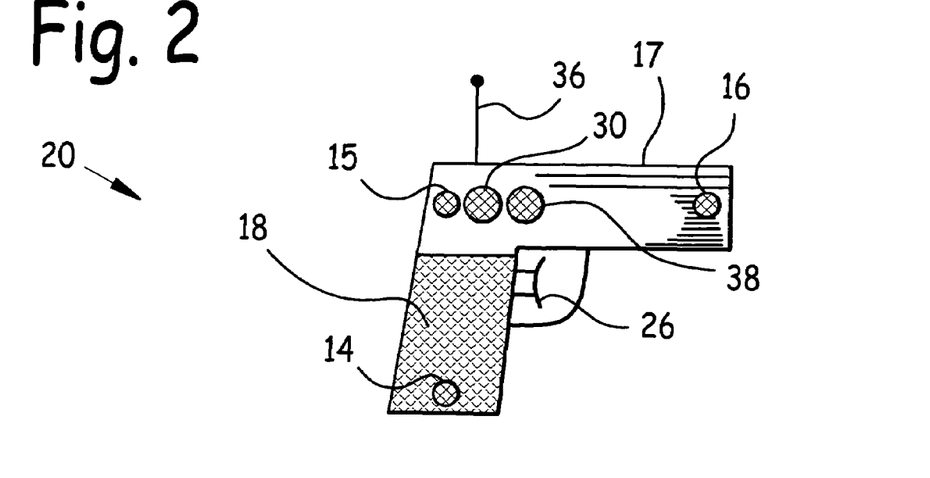
FIG. 2 is a front isometric view of a scanner.
Figure 3:
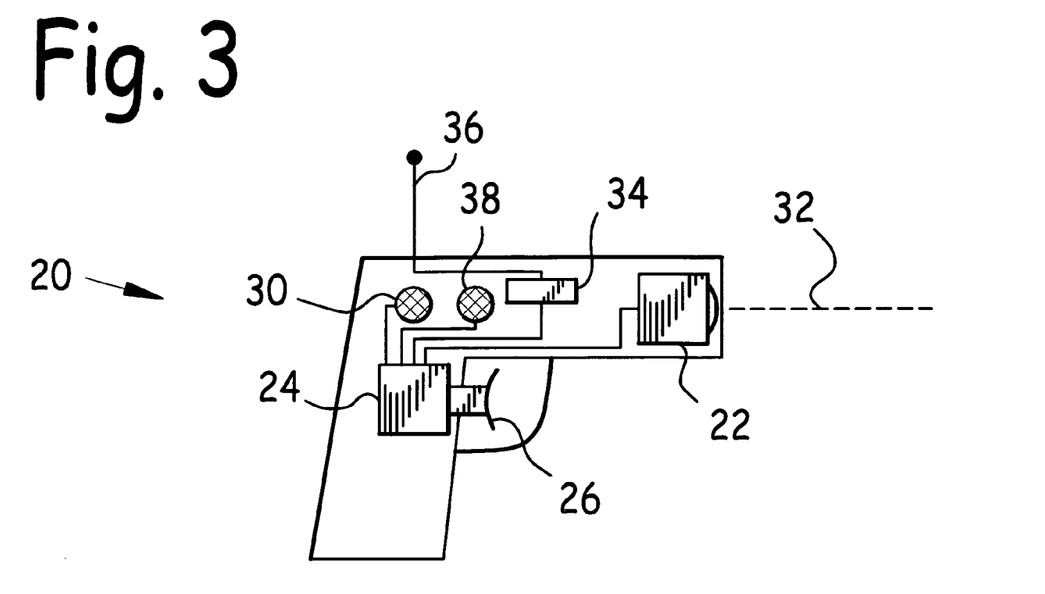
FIG. 3 is a front cross-sectional view of a scanner.

FIG. 2 is a front isometric view of scanner 20. FIG. 3 is a front cross-sectional view of scanner 20. Referring to these two figures, scanner 20 comprises microprocessor 24 electronically connected with trigger 26, penetrating sensor 22, transmitter 34, exclusion control 30, and void control 38. Actuation of trigger 26 has the effect of instructing scanner 20 to commence scanning objects at which scanner 20 is aimed. Releasing trigger 26 has the effect of ceasing the scanning function.

Scanner 20 also comprises a plurality of Radio Frequency Identification targets ("RFID tags") which reflect identified returns to 3-D radar 4. Basic geometry teaches us that from at least three such identified returns, the position and orientation of scanner 20 in three-space may be uniquely determined. In other words, based on a minimum of three identified returns, CPU 10 can determine where scanner is located in three-space, and what direction it's pointed.

In the preferred embodiment, scanner 20 comprised scanner barrel 17 rigidly attached to scanner grip 18, and three RFID tags: first RFID tag 14, second RFID tag 15, and third RFID tag 16. First RFID tag 14 was attached to an end of scanner grip 18 opposite scanner barrel 17; second RFID tag 15 was attached at the intersection of scanner barrel 17 and scanner grip 18, and third RFID tag 16 was attached to an end of scanner barrel 17 opposite scanner grip 18. This positioning of RFID tags afforded the maximum distance between RFID tags, thus contributing to the accuracy of CPU 10's determination of the position and pointing direction of scanner 20 in three dimensions.

RFID tags 14, 15, 16 may be low-cost, passive, long-range ultrawide band (UWB) RFID tags as described in the web page "Welcome to the Website for Candidate LLNL Technologies for Business Plan Competitions October 2007" (Industrial Partnerships Office at the Lawrence Livermore National Laboratory (LLNL), hereby incorporated by reference, and the Low-Cost, Passive, Long-Range Ultrawide Band (UWB) RFID Tags descriptive page (Lawrence Livermore National Laboratory), also hereby incorporated by reference.

Penetrating sensor 22 may be a magneto-radar detector such as is disclosed in U.S. Pat. No. 6,914,552 to McEwan, hereby incorporated by reference, or any other appropriate penetrating sensor which can not only sense initial impingement by its penetrating sensor beam 32 on a solid object, but also its exit from such solid object, plus entry and exit from subsequent objects penetrating sensor beam 32 encounters. Thus, penetrating sensor 22 sends to microprocessor 24 the distance and direction from scanner 20 at which penetrating sensor beam 32 first senses a solid object such as chair 40, and also the distance and direction from scanner 20 at which penetrating sensor beam 32 exits the solid object, such as chair 40, and so on.

Microprocessor 24 continuously sends this information about the solid object (via transmitter 34 and connected transmitter antenna 36) to CPU 10 in base 2, via receiver antenna 9 and receiver 8.

Figure 5:
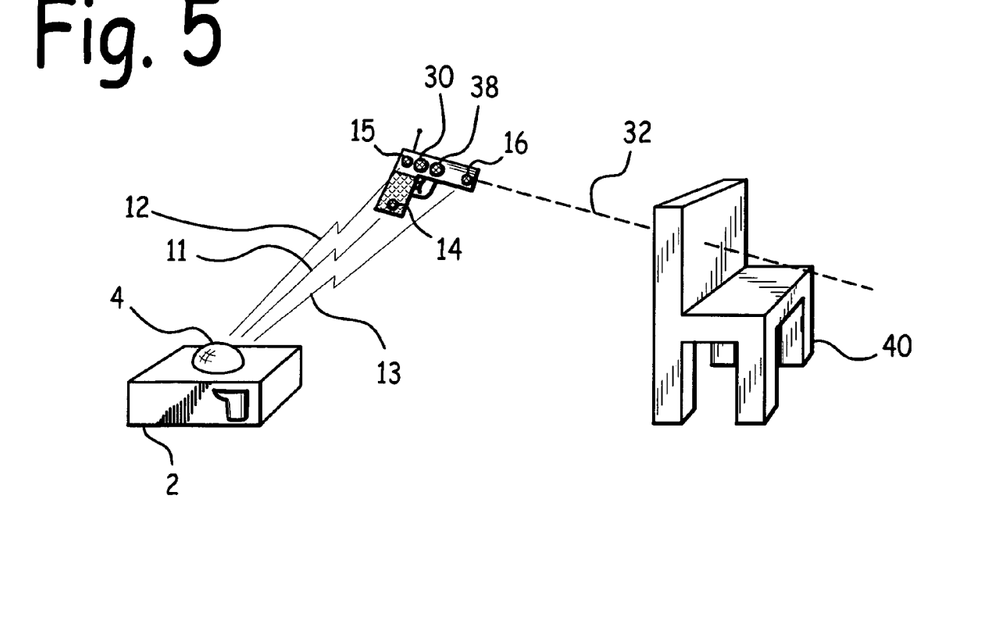
FIG. 5 is a front quarter isometric view of a chair whose volume is being scanned by a scanner in communication with a base station.
Figure 6:
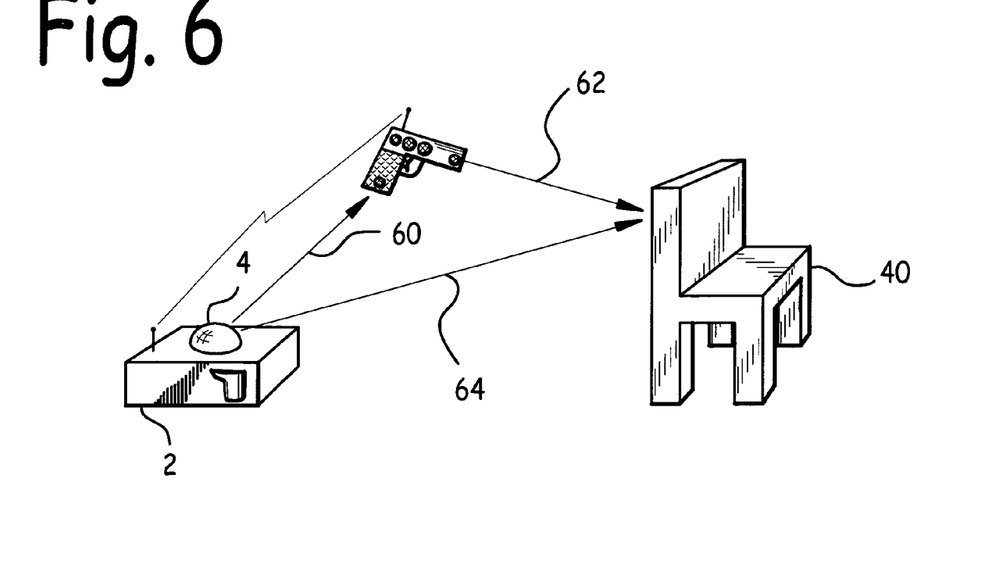
FIG. 6 is a front quarter isometric view of a chair whose volume is being scanned by a scanner in communication with a base station.

Referring now to FIGS. 5 and 6, CPU 10 knows the location and pointing direction of scanner 20 by reference to first return 11 from first RFID tag 14, second return 12 from second RFID tag 15, and third return 13 from third RFID tag 16, which location may be represented by base vector 60, and which pointing direction may be represented by the direction of scanner vector 62. Penetrating sensor 22 provides distant to the solid object being scanned, represented by the length of scanner vector 62.

CPU 10 then adds scanner vector 62 to base vector 60 in order to yield the resultant vector, target position vector 64. Target position vector 64 is the direction and distance from base 2 of the point on the solid object being scanned. Collection of sufficient scanned points on the solid object (chair 40 in this example) gives a very good model of the shape of the object (chair 40 in this example), from which the cubic volume of the solid object may be readily determined with existing solid modeling software, such as is available in commercially available three-dimension computer aided drafting programs.

CPU 10 may be any digital or analog central processing unit which is capable of performing vector addition and interpreting signals from penetrating sensor 22 and 3-D radar 4 in order to model an object being scanned, such as chair 40 in FIGS. 5-10. Software installed on CPU 10 permits the modeling function. A variety of such surface modeling programs are available as a sub-function of a number of commercially available three-dimensional drafting programs, and serve to produce a three-dimensional solid model of an object based on points or lines which have been inputted by a draftsperson.

Microprocessor 24 may be any appropriate digital or analog microprocessor which is capable of sending signals from penetrating sensor 22 to CPU 10, such that CPU 10 may model an object being scanned by penetrating sensor 22.

Transmitter 34 and receiver 8 may be any appropriate communication system capable of communicating points-scanned data from scanner 20 to base 2, including but not limited to infrared, FM, AM, wireless digital, or any other appropriate communication system, including wires connecting scanner 20 to base 2.

Figure 7:
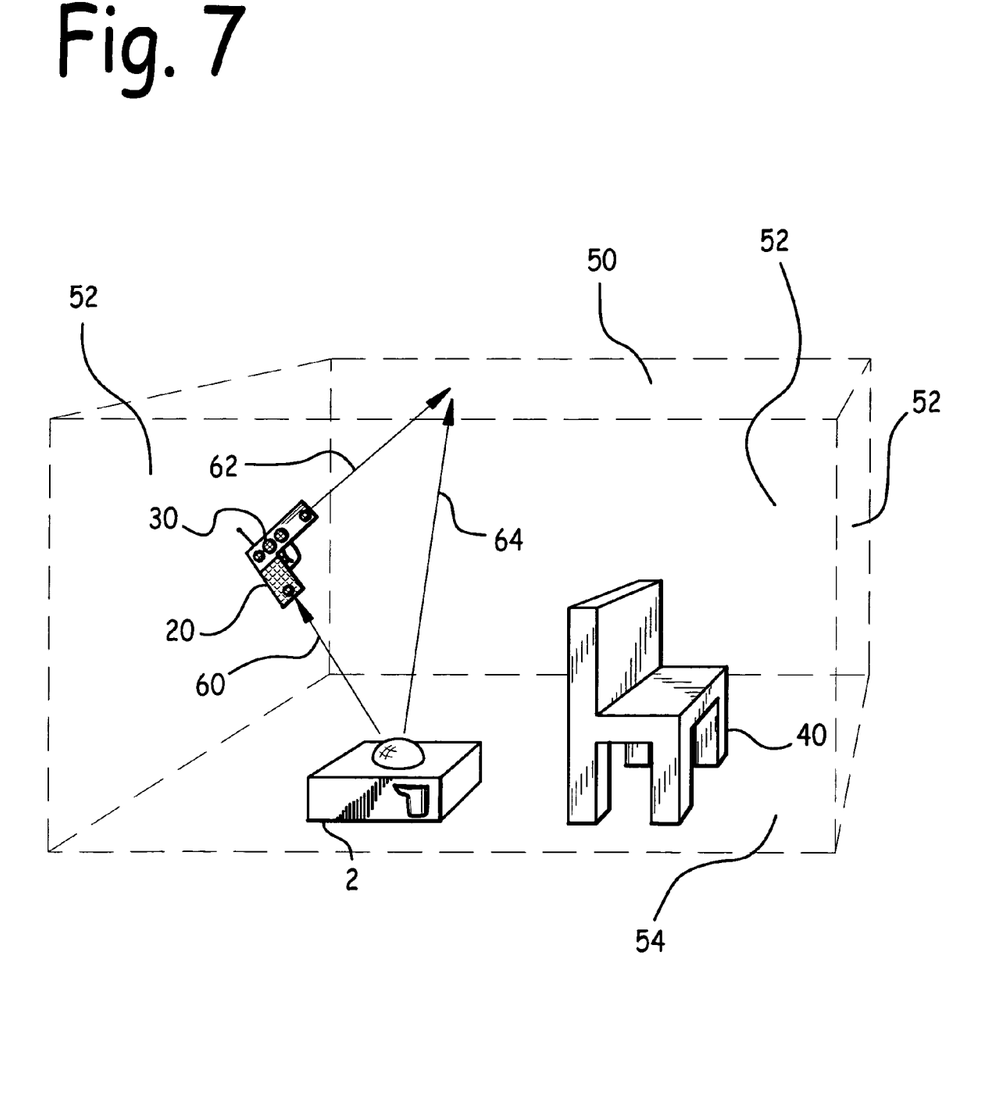
FIG. 7 is a front quarter isometric view of a scanner with its exclusion control activated, being used to scan ceiling, walls and floor to be excluded from volume measurement.

Referring now to FIG. 7, scanner 20 comprises exclusion control 30. Actuation of exclusion control 30 and then scanning ceiling 50, walls 52 and/or floor 54 of a room containing object(s) to be scanned has the effect of instructing CPU 10 to not include these surfaces (or any volumes behind them) in the subsequent volume scan of object(s) resting on the floor or enclosed within the walls and/or ceiling of the room. Once exclusion control 30 is actuated and the floor, walls and/or ceiling of a room have been scanned, exclusion control 30 is de-actuated and a scan of the contents may be initiated.

Figure 8:
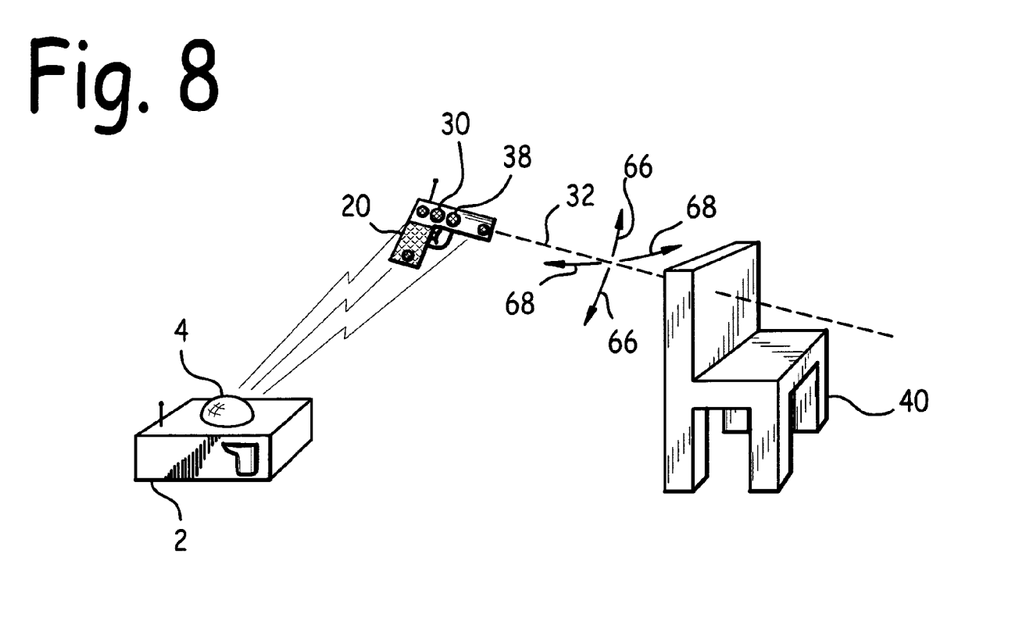
FIG. 8 is a front quarter isometric view of a chair whose volume is being scanned by a scanner in communication with a base station.

FIG. 8 is a front quarter isometric views of a chair 40 whose volume is being scanned by scanner 20 whose position and pointing direction is known to CPU 10 in base station 2. First, ceiling 50, walls 52 and/or floor 54 are excluded as explained above.

Next, scanner 20 is aimed at an object whose volume is to be scanned, as indicated in FIG. 8. Trigger 26 is actuated to commence the scanning function via penetrating sensor beam 32, which will continue until trigger 26 is released.

Scanner 20 is swept over chair 40 so that penetrating sensor beam 32 may impinge upon the entirety of chair 40, both upon entering and upon exiting chair 40. To accomplish this, scanner 20 may be scanned up and down as indicated by vertical arrows 66, as well as back and forth horizontally as indicated by horizontal arrows 68 in FIG. 8, in order to maximize the amount of data points scanned of chair 40 from each perspective.

Figure 9:
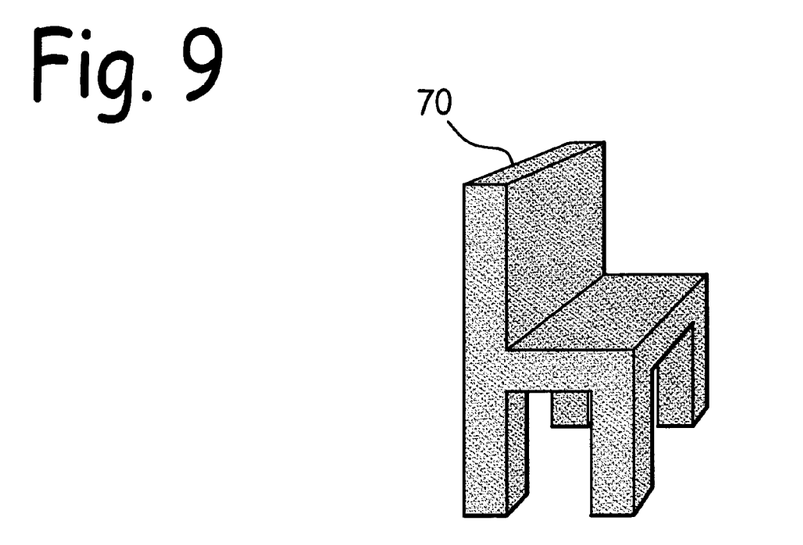
FIG. 9 is a front quarter isometric view of a model of a chair whose volume has been scanned by a scanner in communication with a base station, as modeled by a central processing unit in the base station based on scans of the chair by the scanner.

CPU 10 assembles the constellation of all points scanned into a model as depicted by chair model 70 in FIG. 9. Of course, the more data points scanned, the more accurate the model. Chair 40 is made up of atoms and molecules, just like everything else which is "solid" in this world. If scanner 20 could scan each atom and molecule comprising chair 40, then the resulting model would be completely accurate. As a matter of practicality, if scanner 40 is capable of scanning up to several million data points per minute, the resulting model will be extremely accurate, as indicated in FIG. 9.

Next, CPU 10 calculates the volume of chair 40. Where the volume of an entire room-full (or house-full) of furniture is to be calculated, CPU 10 may maintain a running total of the room and/or house total. After the total volume of a lot of furniture has been scanned and calculated, the chore of quoting a price to move same becomes easy.

Figure 10:
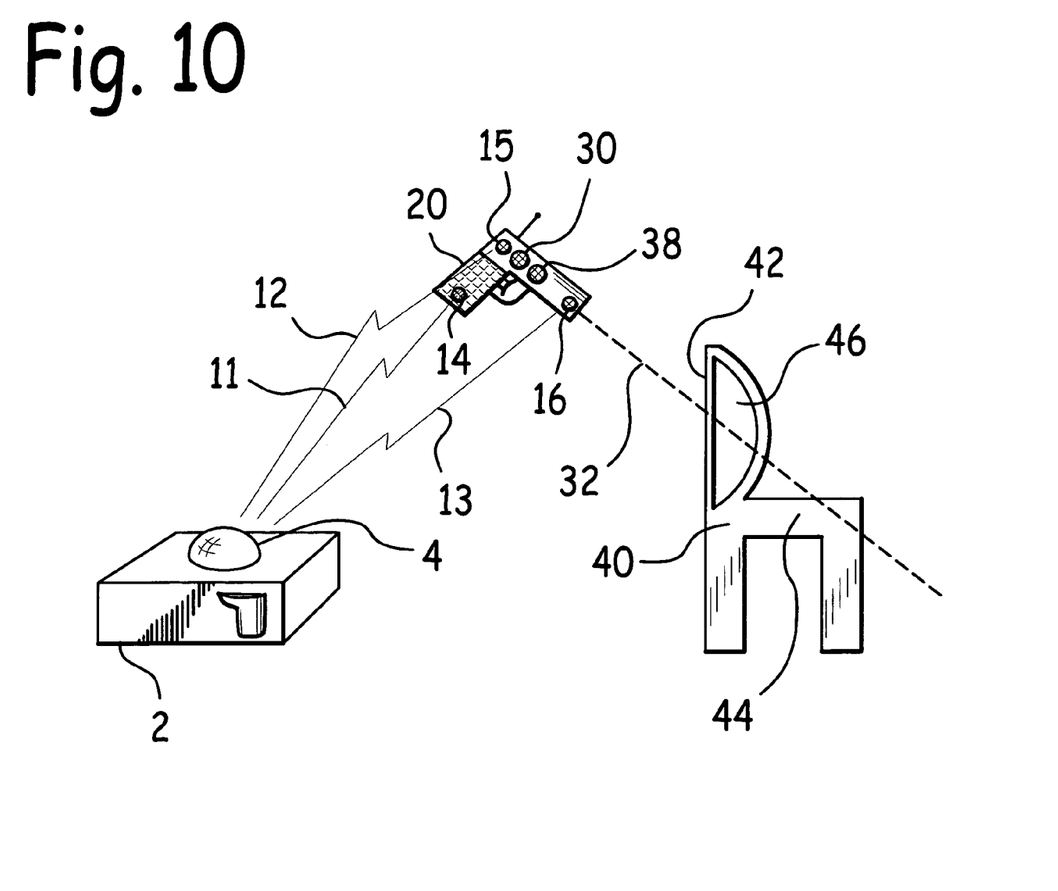
FIG. 10 is a side view of a scanner with its void control activated, being used to scan the volume of a chair exclusive of a chair void.

An alternate embodiment of the instant apparatus and method for measuring volumes is depicted in FIG. 10, wherein scanner 20 further comprises void control 38. Normally, software in CPU 10 is set to ignore voids completely enclosed within exterior solid surfaces of an object being scanned. Sometimes, however, it may be desired to not count voids as solid matter. In such case, actuation of void control 38 has the effect of instructing CPU 10 to subtract the volume of interior voids from the total volume scanned. De-actuation of void control 38 has the effect of instructing CPU 10 to ignore interior voids in its calculation of a solid volume.

In the example depicted in FIG. 10, chair 40 contains chair void 46. Actuation of void control 38 has the effect of instructing CPU 10 to not include the volume of chair void 46 in its calculation of the volume of chair 40. Because penetrating sensor 22 senses both entry and exit from solids, in the example depicted in FIG. 10 penetrating sensor 22 would sense the entry of penetrating sensor beam 32 into the solid material of chair back, the exit of penetrating sensor beam 32 from chair back 42 and into chair void 46, the exit of penetrating sensor beam 32 from chair void 46 and into the solid material of chair back 42, the exit of penetrating sensor beam 32 from chair back 42, the entry of penetrating sensor beam 32 into chair seat 44, and finally the exit of penetrating sensor beam 32 from chair seat 44, and sense a point in three space for each of these entry and exit points. The points are sent to CPU 10 as described above for inclusion in model 70. The more points, the more accurate the model.

Thus, the instant method of measuring volume comprises the steps of:

A. Providing a base comprising a CPU in communication with a receiver and a 3-D radar;

B. Providing a scanner comprising a plurality of RFID tags, and a microprocessor electrically connected to a penetrating sensor, a trigger, and a transmitter;

C. Pointing the scanner at an object whose volume is to be scanned;

D. Actuating the trigger;

E. The CPU determining the location of the scanner relative to the base, and the direction the scanner is pointing, from 3-D radar returns from the RFID tags;

F. Scanning the object whose volume is to be determined with a penetrating sensor beam emitted by the penetrating sensor;

G. The scanner sensing each entry and exit point of the penetrating sensor beam into and out of the object;

H. For each point scanned, determining such point's location relative to the base by summing a base vector (which extends from the base to the scanner) with a scanner vector (which extends from the scanner to the object) in order to obtain a target position vector;

I. The CPU creating a model of object using points which have been scanned with the scanner and each defined by one said target position vector; and J. The CPU calculating a volume of the object.

The instant method of measuring volume may comprise the additional steps of providing an exclusion control on the scanner, actuating the exclusion control, scanning surfaces to be excluded from the volume calculation, and de-actuating the exclusion control, whereby the CPU is instructed to not include in its volume calculation the surfaces scanned while the exclusion control is actuated, nor any material behind such surfaces.

The instant method of measuring volume may comprise the additional steps of providing a void control on the scanner, actuating the void control, scanning at least one void within an object being scanned so as to exclude such at least one void from the volume calculation, whereby the CPU is instructed to not include in its volume calculation internal void(s) scanned while the void control is actuated.

The instant method of measuring volume may comprise the steps of scanning the object by sweeping the scanner vertically up and down the object, and/or scanning the object by sweeping the scanner horizontally back and forth across the object.

While a preferred embodiment of the invention has been illustrated herein, it is to be understood that changes and variations may be made by those skilled in the art without departing from the spirit of the appending claims.

DRAWING ITEM INDEX

| | |
|---|---|
| 2 | base |
| 4 | 3-D radar |
| 6 | dock |
| 8 | receiver |
| 9 | receiver antenna |
| 10 | CPU |
| 11 | first return |
| 12 | second return |
| 13 | third return |
| 14 | first RFID tag |
| 15 | second RFID tag |
| 16 | third RFID tag |
| 17 | scanner barrel |
| 18 | scanner grip |
| 20 | scanner |
| 22 | penetrating sensor |
| 24 | microprocessor |
| 26 | trigger |
| 30 | exclusion control |
| 32 | penetrating sensor beam |

-continued

| 34 | transmitter |
| 36 | transmitter antenna |
| 38 | void control |
| 40 | chair |
| 42 | chair back |
| 44 | chair seat |
| 46 | chair void |
| 50 | ceiling |
| 52 | wall |
| 54 | floor |
| 60 | base vector |
| 62 | scanner vector |
| 64 | target position vector |
| 66 | vertical arrow |
| 68 | horizontal arrow |
| 70 | chair model |

I claim:

1. An apparatus for measuring volumes comprising:
a base comprising a CPU in communication with a 3-D radar and a receiver;
a scanner comprising a plurality of Radio Frequency Identification targets; and a microprocessor in communication with a trigger, a penetrating sensor, and a transmitter; said transmitter communicating with said receiver; said CPU determining a position of said scanner relative to said base and a direction in which said scanner is pointing based on radar returns from said scanner, said penetrating sensor informing said microprocessor points of entry and egress from an object being scanned; whereby actuation of said trigger instructs said scanner to commence scanning an object at which said scanner is aimed and releasing said trigger instructs said scanner to cease said scanning.

2. The apparatus for measuring volumes of claim 1 wherein said scanner further comprises an exclusion control, whereby actuation of said exclusion control instructs said CPU to not include surfaces scanned when said exclusion control is actuated, and de-actuation of said exclusion control resumes normal scanning.

3. The apparatus for measuring volumes of claim 1 wherein said scanner further comprises a void control, whereby actuation of said void control instructs said CPU to not include any void scanned in its volume calculation of said object being scanned.

4. The apparatus for measuring volumes of claim 3 wherein said base further comprises a receiver antenna in communication with said receiver, and wherein said scanner further comprises a transmitter antenna in communication with said transmitter.

5. A method for measuring volumes comprising the steps of:
A. Providing a base comprising a CPU in communication with a receiver and a 3-D radar;
B. Providing a scanner comprising a plurality of Radio Frequency Identification targets, and a microprocessor electrically connected to a penetrating sensor, a trigger, and a transmitter;
C. Pointing said scanner at an object whose volume is to be scanned;
D. Actuating said trigger;
E. Said CPU determining the location of said scanner relative to said base, and a direction said scanner is pointing, from 3-D radar returns from said Radio Frequency Identification targets;
F. Scanning said object whose volume is to be determined with a penetrating sensor beam emitted by said penetrating sensor;
G. Said scanner sensing each entry and exit point of the penetrating sensor beam into and out of said object;
H. For each point scanned, determining such point's location relative to said base by summing a base vector extending from said base to said scanner, with a scanner vector extending from said scanner to said object, to obtain a target position vector associated with each said point;
I. Said CPU creating a model of said object using said points which have been scanned with said scanner, each said point being defined by one said target position vector; and
J. Said CPU calculating a volume of said object.

6. The method of measuring volume of claim 5 comprising the additional steps of providing an exclusion control on said scanner, actuating said exclusion control, scanning surfaces to be excluded from the volume calculation, and de-actuating said exclusion control, whereby while said exclusion control is actuated said CPU is instructed to not include in its volume calculation said surfaces scanned while said exclusion control is actuated, nor any material behind such surfaces.

7. The method of measuring volume of claim 5 comprising the additional steps of providing a void control on said scanner, actuating said void control, scanning at least one void within an object being scanned so as to exclude such at least one void from said volume calculation, whereby said CPU is instructed to not include in its volume calculation internal voids scanned while said void control is actuated.

8. The method of measuring volume of claim 5 comprising the steps of scanning said object by sweeping said scanner vertically up and down said object, and/or scanning said object by sweeping said scanner horizontally back and forth across said object.

9. An apparatus for measuring volumes comprising:
a base comprising a central processing unit in communication with a receiver and a 3-D radar;
a scanner comprising a plurality of Radio Frequency Identification targets; and a microprocessor in communication with a trigger, a penetrating sensor, and a transmitter; said transmitter communicating with said receiver; said trigger commanding said scanner to commence and cease scanning.

10. The apparatus for measuring volumes of claim 9 wherein said scanner further comprises an exclusion control, whereby actuation of said exclusion control instructs said central processing unit to not include surfaces scanned when said exclusion control is actuated, and de-actuation of said exclusion control resumes normal scanning.

11. The apparatus for measuring volumes of claim 10 wherein said scanner comprises a scanner barrel attached to a scanner grip, and wherein a first said Radio Frequency Identification target is attached to an end of said scanner grip opposite said scanner barrel, and a third said Radio Frequency Identification target is attached to an end of said scanner barrel opposite said scanner grip.

12. The apparatus for measuring volumes of claim 11 wherein said scanner comprises a second said Radio Frequency Identification target attached at an intersection of said scanner barrel and said scanner grip.

13. The apparatus for measuring volumes of claim 10 wherein said base further comprises an antenna in communication with said receiver, and wherein said scanner further comprises an antenna in communication with said transmitter.

14. The apparatus for measuring volumes of claim 12 wherein said first Radio Frequency Identification target reflects a first return to said 3-D radar, said second Radio Frequency Identification target reflects a second return to said 3-D radar, and said third Radio Frequency Identification target reflects a third return to said 3-D radar.

* * * * *